(12) United States Patent
Custance (10) Patent No.: US 12,377,956 B2
(45) Date of Patent: Aug. 5, 2025

(54) AIRCRAFT ASSEMBLY WITH MOVEABLE DEVICE AND PANEL DISPLACED FROM MOVEABLE DEVICE

(71) Applicant: AIRBUS OPERATIONS LIMITED, Bristol (GB)

(72) Inventor: Denys Custance, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/422,909

(22) Filed: Jan. 25, 2024

(65) Prior Publication Data

US 2024/0253766 A1 Aug. 1, 2024

(30) Foreign Application Priority Data

Jan. 26, 2023 (GB) ..................... 2301106

(51) Int. Cl.
*B64C 9/02* (2006.01)
*B64C 9/14* (2006.01)
*B64C 9/32* (2006.01)

(52) U.S. Cl.
CPC ............... *B64C 9/02* (2013.01); *B64C 9/146* (2013.01); *B64C 9/323* (2013.01)

(58) Field of Classification Search
CPC ..... B64C 29/02; B64C 29/146; B64C 29/323; B64C 29/32; B64C 3/58
See application file for complete search history.

(56) References Cited

U.S. PATENT DOCUMENTS

| 3,032,332 | A | | 5/1962 | Rose |
| 3,666,210 | A | | 5/1972 | Look |
| 4,422,606 | A | | 12/1983 | Munroe |
| 4,725,026 | A | | 2/1988 | Krafka |
| 5,987,881 | A | * | 11/1999 | Gonidec ................ F02K 1/70 239/265.29 |
| 2012/0261517 | A1 | | 10/2012 | Turner |
| 2015/0035290 | A1 | * | 2/2015 | McGill ............... E05B 63/0056 292/137 |

(Continued)

FOREIGN PATENT DOCUMENTS

| CN | 108202858 A | 6/2018 |
| GB | 2 588 899 A | 5/2021 |

OTHER PUBLICATIONS

EP Search Report For Application No. 24152424.8-1004, dated May 24, 2024, seven pages.

(Continued)

*Primary Examiner* — Arfan Y. Sinaki
(74) *Attorney, Agent, or Firm* — Nixon & Vanderhye P.C.

(57) ABSTRACT

An aircraft assembly is disclosed having a cover with an outer aerodynamic surface and an aperture with a stop adjacent an edge of the aperture, and a moveable device for extending through the aperture in the cover. The moveable device carries a panel attached to the moveable device by a plurality of leaf springs. The assembly is configured so that when the moveable device is moved towards a retracted position the panel bears against the stop forming a substantially flush surface with the outer aerodynamic surface of the cover surrounding the aperture. The panel is displaced from the moveable device by elastic deformation of at least some of the leaf springs.

19 Claims, 6 Drawing Sheets

(56) References Cited

U.S. PATENT DOCUMENTS

| | | |
|---|---|---|
| 2015/0239512 A1 | 8/2015 | Smith |
| 2016/0167766 A1 | 6/2016 | Brakes |
| 2021/0403145 A1 | 12/2021 | Lopez Lopez |
| 2021/0406145 A1 | 12/2021 | Kelley et al. |
| 2022/0144412 A1 | 5/2022 | Bishop |
| 2022/0306274 A1 | 9/2022 | Tulloch |

OTHER PUBLICATIONS

Search Report for Application No. GB2301106.7, dated Jun. 27, 2023, 4 pages.

* cited by examiner

AIRCRAFT ASSEMBLY WITH MOVEABLE DEVICE AND PANEL DISPLACED FROM MOVEABLE DEVICE

CROSS RELATED APPLICATION

This application claims priority to United Kingdom Patent Application GB 2301106.7, filed Jan. 26, 2023, the entire contents of which is hereby incorporated by reference.

FIELD OF THE INVENTION

The present invention relates to an aircraft assembly and to a method of operating an aircraft assembly.

BACKGROUND OF THE INVENTION

Aircraft generally have moveable devices, such as flight control surfaces or landing gear bay doors, that are moveable between a retracted and an extended position relative to the remainder of the aircraft structure. It is often desirable that these moveable devices form a flush surface with the outer aerodynamic surface of the aircraft when the moveable device is in a retracted position, so as to improve the aerodynamic efficiency of the aircraft.

It can be challenging for aircraft designers to create these flush surfaces, especially where the moveable device is relatively large and/or where the adjacent aircraft structure is susceptible to relatively large deflections, e.g. wing bending. Whilst compliant materials, such as flexible seals, can be used to accommodate manufacturing dimensional tolerances and flexing of the aircraft structure to avoid excessive gaps between the outer aerodynamic surface of the aircraft structure and the moveable device, there is a drive to improve the flushness of these moveable devices so as to improve aerodynamic efficiency of the aircraft, especially in these areas where the moveable device is relatively large and where the adjacent aircraft structure is susceptible to relatively large deflections.

SUMMARY OF THE INVENTION

A first aspect of the invention provides an aircraft assembly comprising: a cover with an outer aerodynamic surface and an aperture with a stop adjacent an edge of the aperture; and a moveable device for extending through the aperture in the cover, wherein the moveable device carries a panel attached to the moveable device by a plurality of leaf springs, and the assembly is configured so that when the moveable device is moved towards a retracted position the panel bears against the stop forming a substantially flush surface with the outer aerodynamic surface of the cover surrounding the aperture, and the panel is displaced from the moveable device by elastic deformation of at least some of the leaf springs.

A further aspect of the invention provides a method of operating an aircraft assembly comprising: a cover with an outer aerodynamic surface and an aperture with a stop adjacent an edge of the aperture; and a moveable device for extending through the aperture in the cover, wherein the moveable device carries a panel attached to the moveable device by a plurality of leaf springs, the method comprising moving the moveable device towards a retracted position so that the panel bears against the stop forming a substantially flush surface with the outer aerodynamic surface of the cover surrounding the aperture, and further moving the moveable device to the retracted position so that the panel is displaced from the moveable device by elastic deformation of at least some of the leaf springs.

The panel may have an aerodynamic surface and a reverse side opposite the aerodynamic surface, and the peripheral edge of the reverse side may bear directly or indirectly against the stop. The panel may be shaped so as to conform substantially identically to the outer aerodynamic surface of the cover around the aperture.

Advantageously, the leaf springs have a relatively low profile (by comparison with other spring biasing means such as coil springs for example) and therefore the panel can be mounted to the moveable device in a compact arrangement. The plurality of leaf springs may each deform substantially independently so that the movement of the moveable device to the retracted position does not affect the positioning of the panel against the stop. This allows to accommodate greater tolerance for mounting the moveable device relative to the cover, and also in any actuation mechanism for effecting the movement of the moveable device, yet fine tolerance for siting the panel against the stop. In this way, the panel can be arranged flush with the outer aerodynamic surface of the cover surrounding the aperture without requiring high positional accuracy of mounting the moveable device with respect to the cover, and also ensures that this flush positioning of the panel is retained even as the cover flexes and deforms in normal use.

The leaf springs may be unloaded and generally flat before the elastic deformation. By making the leaf springs generally flat in their unloaded state, the distance between the panel and the moveable device is minimised to be approximately the thickness of the leaf springs. The leaf springs may alternatively have a slight preload so that the panel is urged towards the moveable device even when the leaf springs are generally flat and no other load is applied to the panel. The leaf springs may further alternatively have a slight pre-bend, so that the leaf springs are not flat and the panel is suspended away from the moveable device when no other load is applied to the panel.

The aircraft assembly may further comprise an actuation mechanism for moving the moveable device with respect to the cover. The actuation mechanism may move the moveable device in pure translation, or pure rotation, or a combination of translation and rotation.

The actuation mechanism may be arranged to move the moveable device in a direction substantially normal to the outer aerodynamic surface. This movement may be a pure translation.

The stop may be a rebate around at least a portion of the edge of the aperture. The rebate may be formed continuously around the edge of the aperture, or may be formed in sections with one or more breaks in between the sections.

The plurality of leaf springs may be integrally formed as an array of leaf springs. For example, the leaf springs may be formed in the same sheet material, e.g. by cutting or stamping. The sheet material incorporating the leaf springs may be disposed between the moveable device and the panel carried by the moveable device.

The plurality of leaf springs may be integrally formed with the panel. For example, the leaf springs may be formed on a reverse side of the panel. The leaf springs integrally formed with the panel may be formed by 3D printing the panel and the leaf springs as a unitary item.

The leaf springs may each comprise a first end fixed to the panel and a second end fixed to the moveable device. The leaf spring length may be defined by the distance between the first end and the second end. The fixing of the first and/or second ends may be by welding, bonding, fastening or other suitable fixing means.

Each leaf spring may be substantially linear or curved or U-shaped between the first and second ends. A U-shaped leaf spring may have a long spring length between the first and second ends but yet still remain compact.

An adjacent pair of the leaf springs may be oppositely handed across the panel. The oppositely handed leaf springs may distribute the load on the panel such that the panel is pulled down substantially uniformly against the rebate. This may help limit deflection magnitudes between the leaf springs. The oppositely handed leaf springs may also restrict lateral movement of the panel with respect to the moveable device as the leaf springs deform. Lateral movement of the panel with respect to the moveable device may be undesirable and this could cause the panel to clash with the cover during retraction of the moveable device.

The aircraft assembly may be an aircraft wing and the cover may be a wing cover (skin) of the aircraft wing, and the moveable device may be a flight control surface or vent door. The wing covers may include structural wing covers forming part of a wing box of the wing and/or leading and trailing edge cover panels. Alternatively, the aircraft assembly may be an aircraft fuselage and the cover may be a cover (skin) of the aircraft fuselage, and the moveable device may be a landing gear bay door or a vent door.

A further aspect of the invention provides an aircraft wing comprising the aircraft assembly according to the first aspect, wherein the cover is a cover of the aircraft wing and the moveable device is a pop-up spoiler arranged to retract inside the aircraft wing and to extend through the aircraft wing cover to spoil an airflow over the wing.

The aircraft wing cover may be an upper wing cover, e.g. an upper wing structural cover or a leading or trailing edge cover panel.

The aperture may be an elongate slot.

The pop-up spoiler may be arranged to move substantially normal to the outer aerodynamic surface of the aircraft wing cover.

The spoiler may have a length extending substantially in a spanwise direction of the wing, and a height extending substantially in a thickness direction of the wing.

The spoiler may be moveable between a retracted and an extended position, and wherein the spoiler does not extend beyond an aerofoil profile of the wing when the spoiler is in the retracted position.

The pop-up spoiler may be moved by an actuation mechanism within the aircraft wing that occupies substantially a full depth of the wing between upper and lower covers thereof.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
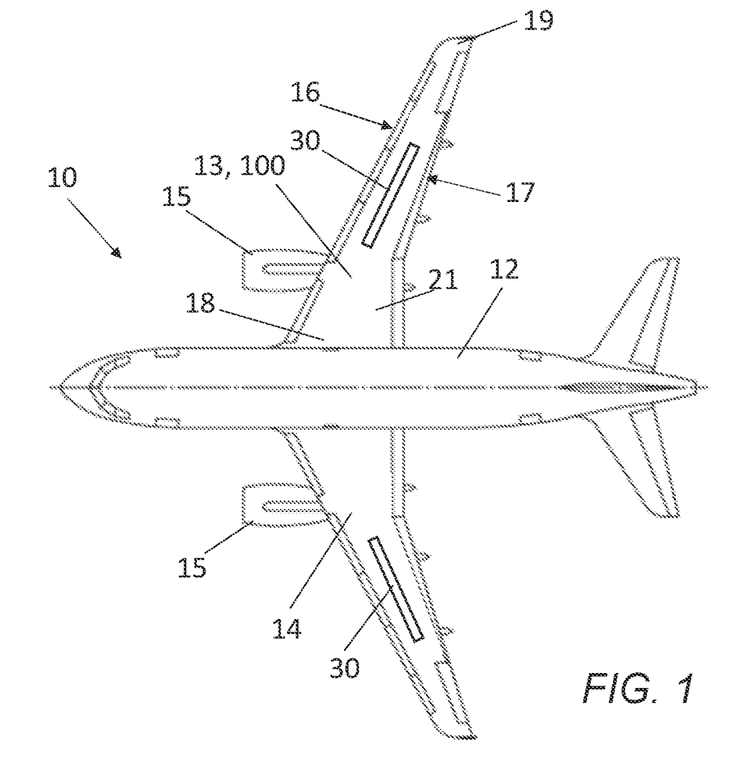
FIG. 1 shows a plan view of an aircraft having a moveable device.

FIG. 1 shows an aircraft 10. The aircraft 10 has a fuselage 12, and starboard and port fixed wings 13, 14. An engine 15 is mounted to each wing 13, 14. The aircraft 10 is a typical jet passenger transport aircraft but the invention is applicable to a wide variety of fixed wing aircraft types, including commercial, military, passenger, cargo, jet, propeller, general aviation, etc. with any number of engines attached to the wings or fuselage.

Each wing has a cantilevered wing structure with a length extending in a spanwise direction from a root 18 to a tip 19, with the root 18 being joined to the aircraft fuselage 12. The wings 13, 14 are similar in construction and so only the starboard wing 13 will be described in detail. The wing 13 has a leading edge 16 and a trailing edge 17. The leading edge 16 is at the forward end of the wing and the trailing edge 17 is at the rearward end of the wing.

The wing 13 is an example of an aircraft assembly 100. The wing 13 may comprise a wing box 20. The wing box 20 forms a structural assembly including forward and rear spars (part of the rear spar shown in FIG. 2), ribs extending between the forward and rear spars. The wing 13 may alternatively have a multi-spar construction. Regardless of the wing structure, the wing has upper and lower wing covers, 21, 22 and leading and trailing edge cover panels (collectively the "wing covers"), which form part of the outer aerodynamic surface of the wing. The wing 13 has an upper aerodynamic surface between the leading and trailing edges 16, 17 and a lower aerodynamic surface between the leading and trailing edges of the wing.

The wing 13 has a spanwise axis S which extends in a direction from the wing root 18 to the wing tip 19, and a chordwise axis which extends in the direction from the leading edge 16 to the trailing edge 17. The wing 13 has an aerofoil cross section. The wing 13 has a thickness direction perpendicular to the chordwise and spanwise directions.

Figure 2:
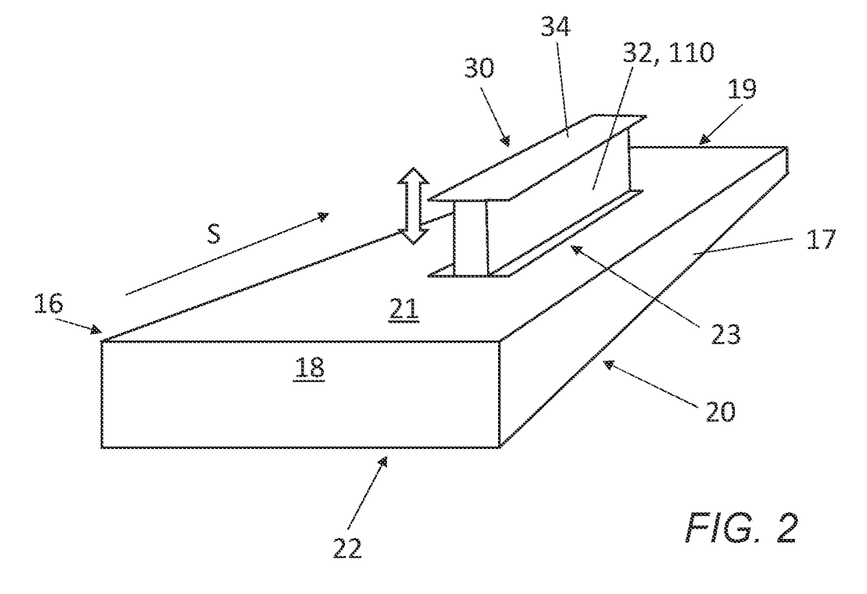
FIG. 2 shows a schematic perspective view of an aircraft wing structure with the moveable device in the deployed position.

The wing 13 has a pop-up spoiler unit 30 as best shown in FIG. 2. The pop-up spoiler unit comprises an actuation mechanism 31 and a spoiler 32 coupled to the actuation mechanism. The spoiler 32 is an example of a moveable device 110. The spoiler 32 is moved by the actuation mechanism 31 to translate along substantially a single linear axis without rotation. The spoiler is arranged to move substantially vertically in a direction substantially normal to the outer aerodynamic surface of the upper wing cover, e.g. wing cover 21. The spoiler 32 is moveable by the actuation mechanism 31 to deploy through an aperture 23 in the upper wing cover 21. Alternatively, the spoiler 32 is moveable by the actuation mechanism 31 to deploy through an aperture in another of the wing covers, e.g. a leading edge cover panel or a trailing edge cover panel on the upper or lower surface of the wing. The spoiler 32 is configured to move between a retracted position in which the spoiler is fully within the aerofoil profile of the wing 13, and an extended position in which the spoiler extends above the surface of the upper wing cover 21. The spoiler 23 may have a plurality of extended positions.

The spoiler 32 is arranged as a substantially flat wall or thick plate facing the oncoming airflow over the upper wing cover 21 when in the extended position. The spoiler 32 may have a length extending substantially in a spanwise direction of the wing, and a height extending substantially in a thickness direction of the wing. The length of the spoiler 32 may be several times its height. With the spoiler 32 facing the oncoming airflow, the actuation mechanism 31 may be behind the thick plate so as to be protected by the spoiler from high speed airflow. The aperture 23 in the upper wing cover 21 may be an elongate slot, preferably a substantially rectangular slot.

Figure 3:
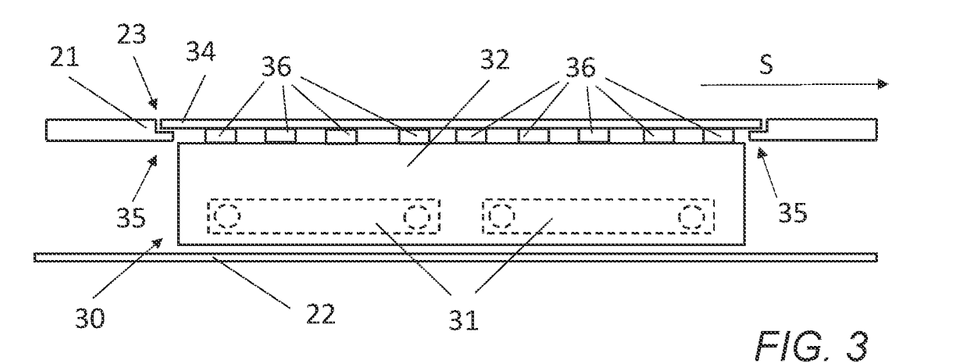
FIG. 3 shows a schematic spanwise sectional view of the aircraft wing structure with the moveable device fully retracted.

The spoiler 32 carries a panel 34. The panel 34 has an upper surface which forms a substantially flush surface with an outer aerodynamic surface of the upper wing cover, e.g. wing cover 21, when the spoiler 32 is in the retracted position. The panel 34 may be a substantially flat plate mounted to the top of the spoiler 32 to form a 'top hat'. The panel 34 generally moves with the deployment and retraction of the spoiler 32. The panel 34 may have a slightly curved surface to match the aerofoil profile of the wing 13 (i.e. the shape of the outer aerodynamic surface of the wing cover(s)) when the panel 34 occupies the aperture 23. FIG. 3 shows the spoiler 32 in the retracted position.

As shown in FIG. 3, the aperture 23 has a stop 35. The stop 35 may be formed as a rebate around at least a portion of the edge of the aperture 23. The rebate may be formed continuously around the edge of the aperture, or may be formed in sections with one or more breaks in between the sections. The depth of the rebate may match the thickness of the panel 34 so that the upper surface of the panel is flush with the outer aerodynamic surface of the upper wing cover 21 when the spoiler 32 is in the retracted position.

The panel 34 is coupled to the moveable device, such as spoiler 32, by a plurality of leaf springs 36. The leaf springs 36 enable the panel 34 to be displaced relative to the moveable device. When the moveable device is fully retracted, as shown in FIG. 3, the panel 34 bears against the stop 35 and the leaf springs 36 are elastically deformed such that the panel 34 is displaced away from the moveable device. Where the stop 35 is formed as the rebate around at least a portion of the edge of the aperture 23 the rebate contacts (directly or indirectly) the peripheral edge of the reverse side of the panel 34.

Figure 4:
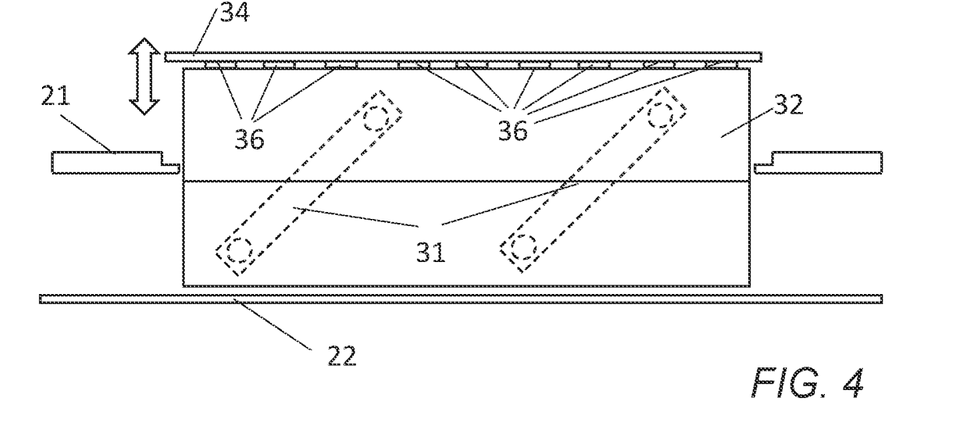
FIG. 4 shows a schematic spanwise sectional view of the aircraft wing structure with the moveable device fully deployed.

By activating the actuation mechanism 31 to move the spoiler from the retracted position to the fully extended position, shown in FIG. 4, the spoiler 32 is moved through the aperture 23. The panel 34 atop the moveable device, such as spoiler 32, lies substantially parallel with the outer aerodynamic surface of the upper wing cover, e.g. wing cover 21, so that in the extended position of the spoiler the panel 34 is substantially aligned with the oncoming airflow over the wing 13.

Once the panel 34 is moved clear of the stop 35, during the beginning of the extension of the moveable device from the fully retracted position, the force imparted by the stop 35 on the panel 34 is removed and the leaf springs 36 are biased to displace the panel 34 towards the moveable device.

In FIG. 4, the panel 34 is shown closely coupled to the moveable device, illustrating an example in which the leaf springs 36 are generally flat when unloaded. By making the leaf springs 36 generally flat in their unloaded state, the distance between the panel and the moveable device is minimised to be approximately the thickness of the leaf springs.

Advantageously, the leaf springs 36 have a relatively low profile (by comparison with other spring biasing means such as coil springs for example) and therefore the panel 34 can be mounted to the moveable device in a compact arrangement. The plurality of leaf springs 36 may each deform substantially independently so that the movement of the moveable device to the retracted position does not affect the positioning of the panel 34 against the stop 35. This allows to accommodate greater tolerance for mounting the moveable device relative to the cover 21, and also in the actuation mechanism 31 for effecting the movement of the moveable device, yet fine tolerance for siting the panel against the stop. In this way, the panel can be arranged flush with the outer aerodynamic surface of the cover 21 surrounding the aperture 23 without requiring high positional accuracy of mounting the moveable device with respect to the cover, and also ensures that this flush positioning of the panel is retained even as the cover flexes and deforms in normal use.

The leaf springs may alternatively have a slight preload so that the panel is urged towards the moveable device even when the leaf springs are generally flat and no other load is applied to the panel. A slight pre-load may benefit from the compactness noted above and further advantageously the pre-load may act against aerodynamic low pressure forces tending to displace the panel 34 away from the stop 35 when the moveable device is retracted, or to displace or deflect the panel away from the top of the moveable device when the moveable device is extended which may add undesirable load to the moveable device. The pre-load may require an additional manufacturing step in forming the leaf springs and/or attaching the panel to the moveable device. The panel 34 is displaced away from the moveable device when the panel bears against the stop 35.

The leaf springs 36 may further alternatively have a slight pre-bend, so that the leaf springs are not flat and the panel 34 is suspended away from the moveable device when no other load is applied to the panel, e.g. the moveable device is extended in the absence of aerodynamic loads, and the leaf springs are in a neutral position. The panel 34 is displaced further away from this neutral position when the panel bears against the stop 35.

Figure 7:
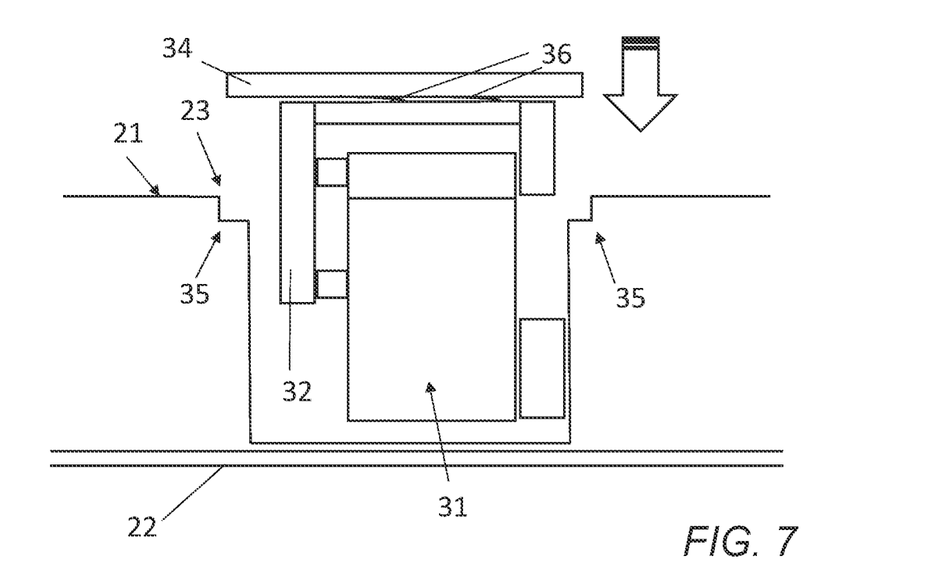
FIG. 7 shows a schematic chordwise sectional view of the aircraft wing structure with the moveable device being retracted.
Figure 8:
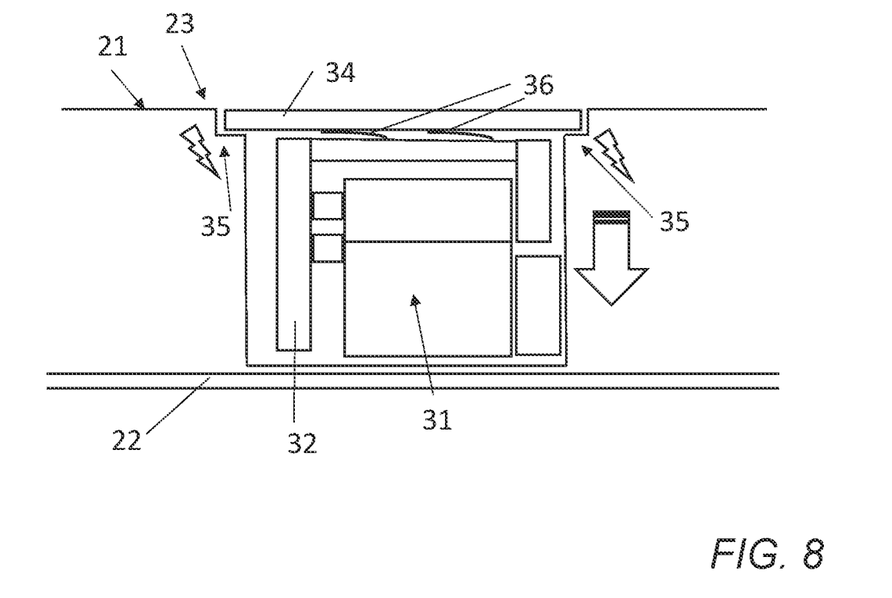
FIG. 8 shows a schematic chordwise sectional view of the aircraft wing structure with the moveable device being retracted and the panel making contact with the stop.
Figure 9:
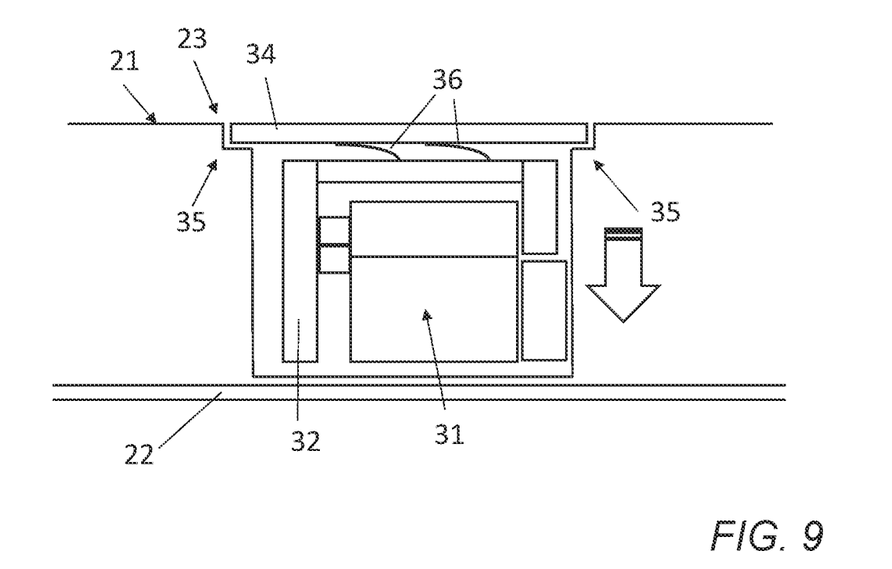
FIG. 9 shows a schematic chordwise sectional view of the aircraft wing structure with the moveable device fully retracted.

FIGS. 5 to 9 illustrate a sequence of movement of the moveable device, spoiler 32, from a fully retracted position (FIG. 5) through an extension (FIG. 6), a retraction (FIG. 7), further retraction causing engagement of the panel with the stop (FIG. 8) and finishing with a return to the fully retracted position (FIG. 9). FIGS. 5 to 9 each show chordwise schematic sectional views through the wing 13.

Figure 5:
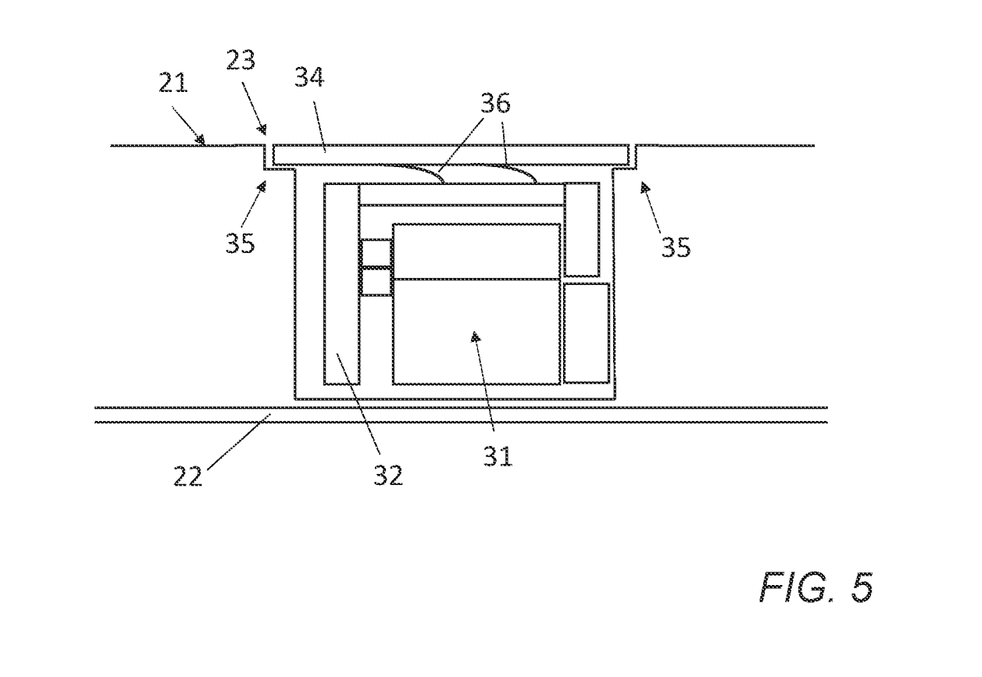
FIG. 5 shows a schematic chordwise sectional view of the aircraft wing structure with the moveable device fully retracted.

The chordwise view of FIG. 5 corresponds to position of the moveable device in the spanwise view of FIG. 3. As such, in FIG. 5, the moveable device is fully retracted and the panel 34 bears against the stop 35 and the leaf springs 36 are elastically deformed such that the panel 34 is displaced away from the moveable device. The actuation mechanism 31 applies the force to the spoiler 32 to elastically deform the leaf springs 36 between the spoiler 32 and the panel 34 which is reacted by the stop 35. In the fully retracted position the spoiler is fully within the aerofoil profile of the wing 13 and not exposed to the oncoming airflow over the wing 13.

Figure 6:
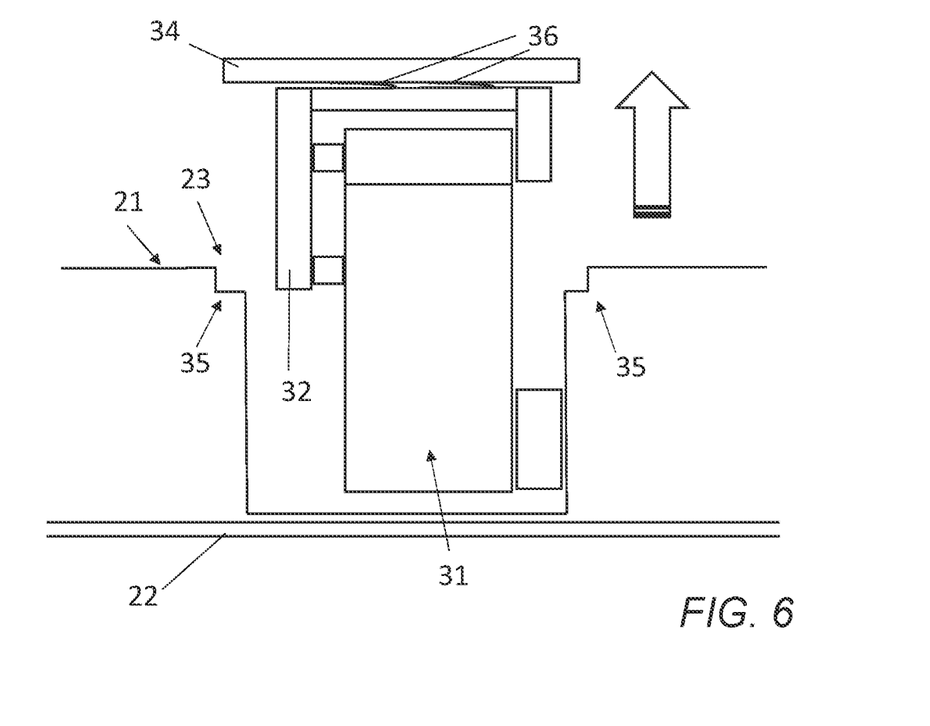
FIG. 6 shows a schematic chordwise sectional view of the aircraft wing structure with the moveable device being deployed.

The chordwise view of FIG. 6 corresponds to position of the moveable device in the spanwise view of FIG. 4. As such, in FIG. 6, the moveable device is fully extended the spoiler 32 having been moved through the aperture 23 by actuation mechanism 31. The spoiler 32 is arranged as a substantially flat wall or thick plate facing the oncoming airflow over the upper wing cover 21 when in the extended position. Once the panel 34 is moved clear of the stop 35, during the beginning of the extension of the moveable device from the fully retracted position, the force imparted by the stop 35 on the panel 34 is removed and the leaf springs 36 are biased to displace the panel 34 towards the moveable device. Comparing FIGS. 5 and 6 it can be seen that the leaf springs 36 are substantially flat and unloaded in FIG. 6 whereas they are elastically deformed and loaded in FIG. 5.

In FIG. 7, the moveable device is retracting from the fully extended position but the panel 34 is still clear of the stop 35 and so the leaf springs 36 remain biased to urge the panel 34 towards the moveable device, like in FIG. 6. The spoiler 32 is still partially in the airflow over the wing 13 in FIG. 6.

In FIG. 8, the moveable device is retracting and the panel 34 is just contacting the stop 35. The leaf springs 36 are starting to elastically deform as the actuation mechanism 31 applies the force to the spoiler 32 to elastically deform the leaf springs 36 between the spoiler 32 and the panel 34 which is reacted by the stop 35 whilst the spoiler is still retracting. The panel 34 is starting to displace away from the moveable device compared to FIG. 7. In this position at the point of contact between the panel and the stop, the spoiler is fully within the aerofoil profile of the wing 13 and not exposed to the oncoming airflow over the wing 13.

Finally, FIG. 9 shows the same fully retracted configuration of the moveable device, the same as FIG. 5. The cycle of extension and retraction is complete and repeatable.

Figure 10:
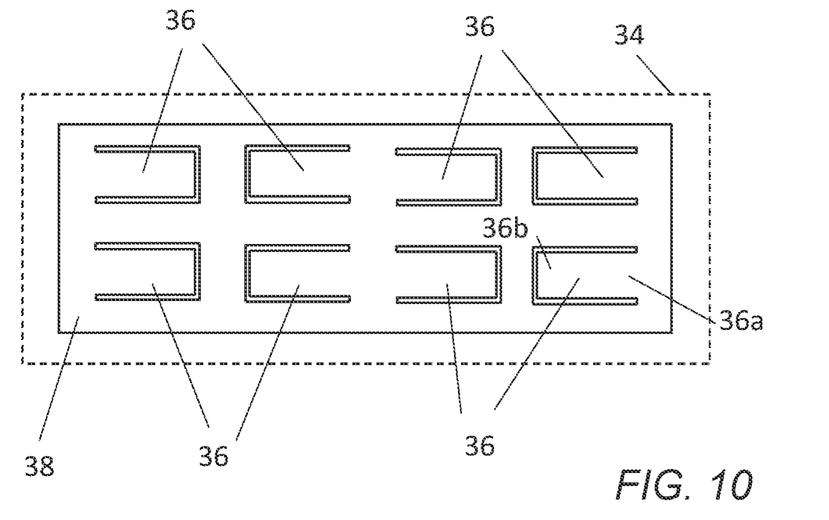
FIG. 10 shows a plan view of the leaf springs according to a first example.

FIG. 10 illustrates an example of an array of the leaf springs 36 to be used in the aircraft assemblies described above. FIG. 10 shows the outline of the panel 34 in broken line. The plurality of leaf springs 36 are integrally formed as an array of leaf springs. The leaf springs 36 are formed in a common leaf spring frame 38. Each leaf spring 36 in this example is a generally linear, rectangular leaf have a constrained first end 36a and a 'free' second end 36b with the leaf spring frame 38 taken as the reference. That is, the constrained first end 36a is built into the frame 38 and the second end 36b is cantilevered from the first end. The leaf springs 36 in the leaf spring frame 38 may be formed, e.g. by cutting or stamping, the leaf springs from the same sheet material.

The sheet material incorporating the leaf springs, i.e. the leaf springs 36 in the frame 38, may be disposed between the moveable device and the panel 34 carried by the moveable device. The frame 38 and thereby the first ends 36a of each of the respective leaf springs 36 may be fixed to the reverse side of the panel 34. The second ends 36b of the respective leaf springs may be fixed to the moveable device. The fixing of the first and/or second ends may be by welding, bonding, fastening or other suitable fixing means. In an alternative arrangement, the fixing may be reversed so that the frame 38 and thereby the first ends 36a of each of the respective leaf springs 36 may be fixed to the moveable device; and the second ends 36b of the respective leaf springs may be fixed to the panel 34.

In a further alternative arrangement, the plurality of leaf springs 36 may be integrally formed with the panel 34. For example, the leaf spring frame 38 may be integrally formed with the panel 34. For example, the leaf springs may be formed on a reverse side of the panel. The leaf springs integrally formed with the panel may be formed by 3D printing the panel and the leaf springs as a unitary item.

Of course, the leaf springs 36 need not be formed in a leaf spring frame but could instead be discrete leaf springs attached at one end to the panel and at the other end to the moveable device.

Figure 11:
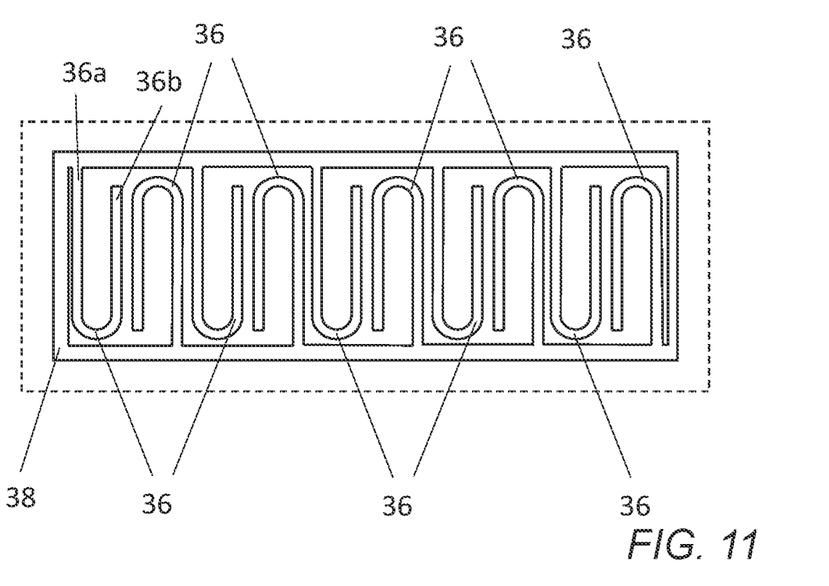
FIG. 11 shows a plan view of the leaf springs according to a second example.

The leaf spring length may be defined by the distance between the first end and the second end. Each leaf spring may be substantially linear, such as shown in FIG. 10, or may be curved or U-shaped, for example, between the first and second ends. FIG. 11 shows an alternative leaf spring arrangement in which the leaf springs are generally U-shaped. A U-shaped leaf spring may have a long spring length between the first and second ends 36a, 36b but yet still remain compact.

An adjacent pair of the leaf springs 36 may be oppositely handed across the panel 34. The oppositely handed leaf springs may distribute the load on the panel 34 such that the panel 34 is pulled down substantially uniformly against the rebate. This may help limit deflection magnitudes between the leaf springs. The oppositely handed leaf springs may also restrict lateral movement of the panel with respect to the moveable device as the leaf springs deform. Lateral movement of the panel with respect to the moveable device may be undesirable and this could cause the panel to clash with the cover during retraction of the moveable device.

In FIG. 10, the leaf springs 36 are arranged in two rows across the panel, and in each row there are pairs of oppositely handed leaf springs so that the first ends 36a, and/or second ends 36b, of an adjacent pair of leaf springs 36 are back to back. Similarly, in FIG. 11, the leaf springs 36 are arranged in a single row and there are oppositely handed pairs of leaf springs across the row. In each pair of leaf springs, the first ends 36a are in opposite corners of a quadrant, and the second ends are in the middle of opposing sides of the quadrant. In each of FIGS. 10 and 11 the pairs of leaf springs could be rotated through 90 degrees. It will be appreciated that there are a wide variety of arrangements of the leaf springs that would be compatible with the above stated objectives of the leaf springs.

As can be seen from FIG. 3, where the moveable device is configured as a pop-up spoiler 32, the pop-up spoiler unit 30 may occupy substantially a full depth of the wing structure 24 between upper and lower covers 21, 22 thereof. The spoiler 32 is substantially rigid to ensure that it does not significantly deflect under the high aerodynamic loads when in the extended position, even for a large transonic aircraft if deployed at cruise speeds, e.g. around Mach 0.8. The pop-up spoiler unit 30 may be mounted to the internal wing structure 24 between the upper and lower covers 21, 22.

Figure 12:
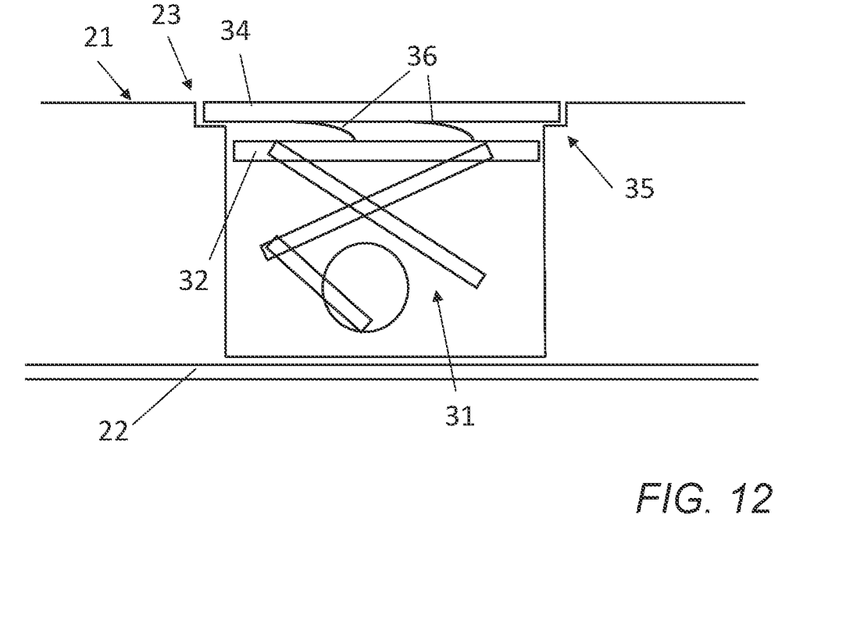
FIG. 12 shows a schematic chordwise sectional view of an aircraft structure with an alternative moveable device fully retracted.
Figure 13:
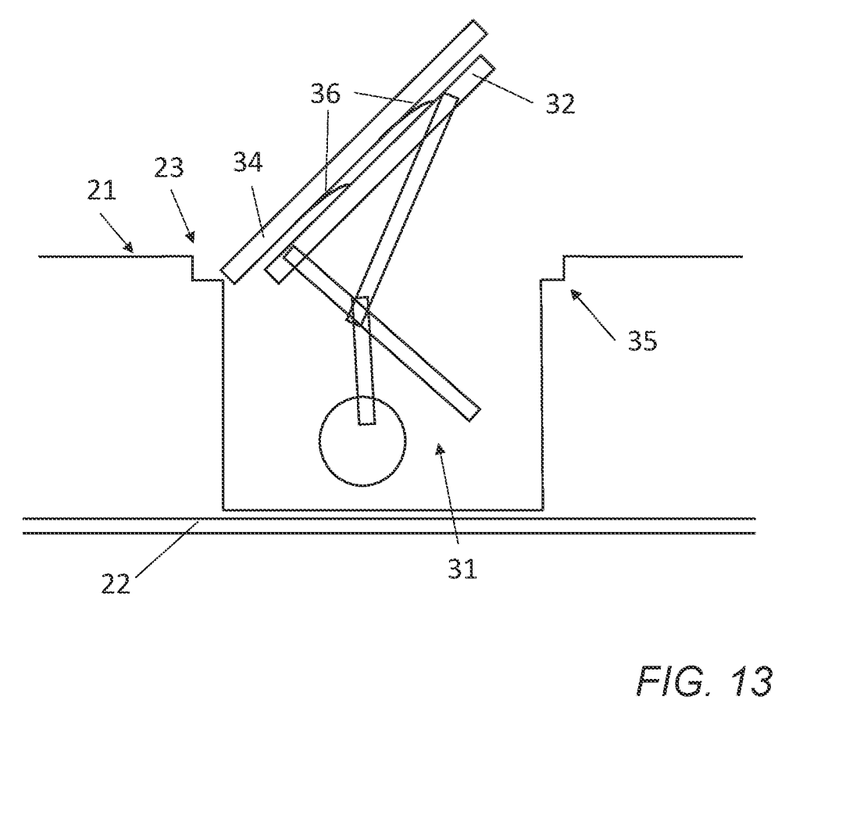
FIG. 13 shows a schematic chordwise sectional view of the aircraft structure with the alternative moveable device fully deployed.

Whilst in the above described embodiments the moveable device is a pop-up spoiler, the moveable device can be configured in a variety of different ways and the motion of the moveable device need not be purely translational. For example, FIGS. 11 and 12 show the moveable device configured as a spoiler 32 of the aircraft wing, where the spoiler is configured to be rotated between a fully retracted (FIG. 11) and a fully extended (FIG. 12) position. Like reference numerals are used to denote like or similar parts with those described previously. The spoiler 32 is moved by actuation mechanism 31 which in this example has a rotary actuator and four bar linkage arrangement coupled to the spoiler 32. The spoiler 32 carries the panel 34 coupled by leaf springs 36 in a substantially identical way to the previously described embodiments, and the leaf springs function in the same way as before. As can be seen, the leaf springs 36 aid with the flushness of the panel 34 which sits in the rebate of stop 35 in the upper wing cover 21, during the final retraction of the spoiler 32 which in this instance performs a rotation to the extended position along a curved line.

In yet further alternative embodiments, the aircraft assembly may be an aircraft wing and the cover may be a cover (skin) of the aircraft wing, and the moveable device may be a flight control surface or vent door. Alternatively, the aircraft assembly may be an aircraft fuselage and the cover may be a cover (skin) of the aircraft fuselage, and the moveable device may be a landing gear bay door or a vent door. These and other variations will be appreciated by those skilled in the art.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly, comprising:
   a cover with an outer aerodynamic surface and an aperture with a stop adjacent to an edge of the aperture;
   a moveable device for extending through the aperture in the cover, wherein the moveable device carries a panel attached to the moveable device by a plurality of leaf springs, and the assembly is configured so that when the moveable device is moved towards a retracted position the panel bears against the stop forming a substantially flush surface with the outer aerodynamic surface of the cover surrounding the aperture;
   wherein the panel is configured to be displaced from the moveable device by elastic deformation of at least two leaf springs of the plurality of leaf springs; and,
   wherein an adjacent pair of leaf springs of the plurality of springs are symmetrically positioned with respect to each other across the panel to restrict lateral movement of the panel with respect to the moveable device as the leaf springs deform.

2. The aircraft assembly according to claim 1, further comprising an actuation mechanism for moving the moveable device with respect to the cover.

3. The aircraft assembly according to claim 2, wherein the actuation mechanism is arranged to move the moveable device in a direction substantially normal to the outer aerodynamic surface.

4. The aircraft assembly according to claim 2, wherein the actuation mechanism is configured to translate the moveable device with respect to the cover.

5. A method of operating an aircraft assembly, comprising:
   providing a cover with an outer aerodynamic surface and an aperture with a stop adjacent to an edge of the aperture;
   providing a moveable device for extending through the aperture in the cover, wherein the moveable device carries a panel attached to the moveable device by a plurality of leaf springs,
   providing an actuation mechanism for moving the moveable device with respect to the cover,
   the method comprising
      moving the moveable device towards a retracted position so that the panel bears against the stop forming a substantially flush surface with the outer aerodynamic surface of the cover surrounding the aperture,
      moving the moveable device to the retracted position so that the panel is displaced from the moveable device and at least two leaf springs of the plurality of leaf springs are elastically deformed, and
      moving the moveable device with respect to the cover by translating the moveable device with respect to the cover.

6. An aircraft assembly, comprising:
   a cover with an outer aerodynamic surface and an aperture with a stop adjacent an edge of the aperture;
   a moveable device for extending through the aperture in the cover, wherein the moveable device carries a panel attached to the moveable device by a plurality of leaf springs, and the assembly is configured so that when the moveable device is moved towards a retracted position the panel bears against the stop forming a substantially flush surface with the outer aerodynamic surface of the cover surrounding the aperture;
   wherein the panel is configured to be displaced from the moveable device by elastic deformation of at least two leaf springs of the plurality of leaf springs; and,
   an actuation mechanism for moving the moveable device with respect to the cover;
   wherein the actuation mechanism is configured to translate the moveable device with respect to the cover.

7. The aircraft assembly according to claim 6, wherein the leaf springs are unloaded and generally flat before the elastic deformation.

8. The aircraft assembly according to claim 6, wherein the stop is a rebate around at least a portion of the edge of the aperture.

9. The aircraft assembly according to claim 6, wherein the plurality of leaf springs are integrally formed as an array of leaf springs.

10. The aircraft assembly according to claim 6, wherein the plurality of leaf springs are integrally formed with the panel.

11. The aircraft assembly according to claim 6, wherein the leaf springs each comprise a first end fixed to the panel and a second end fixed to the moveable device.

12. The aircraft assembly according to claim 11, wherein each leaf spring is substantially linear or curved or U-shaped between the first and second ends.

13. The aircraft assembly according to claim 12, wherein an adjacent pair of leaf springs of the plurality of leaf springs are symmetrically positioned with respect to each other across the panel to restrict lateral movement of the panel with respect to the moveable device as the leaf springs deform.

14. The aircraft assembly according to claim 6, wherein the cover is a cover of an aircraft wing and the moveable device is a pop-up spoiler arranged to retract inside the aircraft wing and to extend through the aircraft wing cover to spoil an airflow over the wing.

15. The aircraft assembly according to claim 14, wherein the aircraft wing cover is an upper wing cover.

16. The aircraft assembly according to claim 14, wherein the aperture is an elongate slot.

17. The aircraft assembly according to claim 14, wherein the pop-up spoiler is arranged to move substantially normal to the outer aerodynamic surface of the aircraft wing cover.

18. The aircraft assembly according to claim 15, wherein the pop-up spoiler is moved by an actuation mechanism within the aircraft wing that occupies substantially a full depth of the wing between the upper wing cover and a lower wing cover.

19. An aircraft assembly, comprising:
- a cover with an outer aerodynamic surface and an aperture with a stop adjacent an edge of the aperture;
- a moveable device for extending through the aperture in the cover, wherein the moveable device carries a panel attached to the moveable device by a plurality of leaf springs, and the assembly is configured so that when the moveable device is moved towards a retracted position the panel bears against the stop forming a substantially flush surface with the outer aerodynamic surface of the cover surrounding the aperture;
- wherein the panel is configured to be displaced from the moveable device by elastic deformation of at least two leaf springs of the plurality of leaf springs; and,
- wherein the cover is a cover of an aircraft wing and the moveable device is a pop-up spoiler arranged to retract inside the aircraft wing and to extend through the aircraft wing cover to spoil an airflow over the wing.

\* \* \* \* \*